United States Patent [19]

Suzuki et al.

[11] 4,378,146
[45] Mar. 29, 1983

[54] AUTOMATIC CONTROL DEVICE FOR CONTROLLING THE IRIS DIAPHRAGM IN AN OPTICAL SYSTEM

[75] Inventors: Shoji Suzuki, Setagaya; Takeki Asakawa, Omiya; Hiroshi Koike, Tokyo, all of Japan

[73] Assignee: Koike Seiki Co., Ltd., Tokyo, Japan

[21] Appl. No.: 238,542

[22] Filed: Feb. 26, 1981

[51] Int. Cl.³ .............................................. G05D 25/02
[52] U.S. Cl. ..................................... 350/269; 354/44
[58] Field of Search ................. 350/17, 269, 449, 450; 354/44, 234, 271, 274; 310/156

[56] References Cited

U.S. PATENT DOCUMENTS 3,654,845 4/1972 Fahlenberg et al. ................. 354/234
3,687,042 8/1972 Mizui et al. .......................... 354/234
4,100,558 7/1978 Koike et al. ....................... 354/44 X
4,113,359 9/1978 Koike et al. ........................ 350/269

Primary Examiner—John K. Corbin
Assistant Examiner—Matthew W. Koren
Attorney, Agent, or Firm—Koda and Androlia

[57] ABSTRACT

An automatic control device for controlling the iris diaphragm in an optical system having lens groups therein, comprising an outer casing adapted to be detachably secured to the optical system surrounding the optical system and an iris diaphragm drive mechanism mounted in the outer casing. The iris drive mechanism includes a drive source in the form of an annular rotary electric motor provided by an annular rotor and an annular stator opposing the annular rotor, said rotor and stator being disposed in the optical axis of the optical system. The electric motor responses to a signal from photometer means of the optical system and rotates the rotor to thereby operate the iris diaphragm.

10 Claims, 10 Drawing Figures

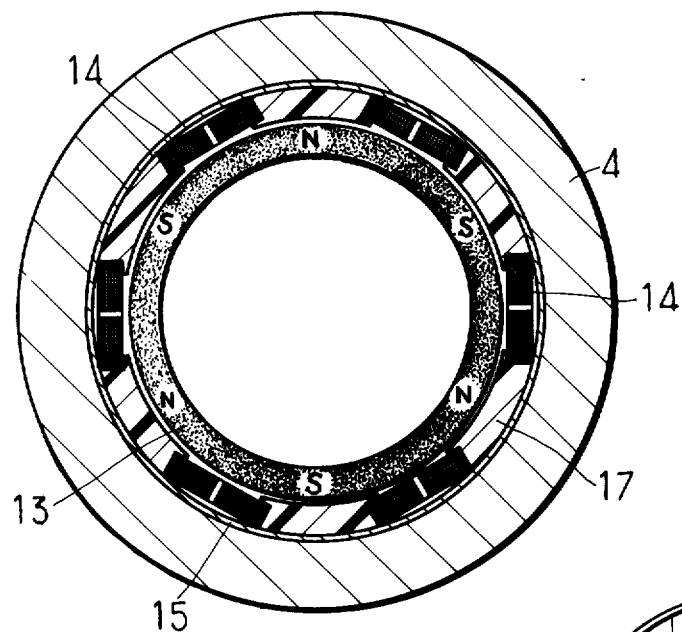
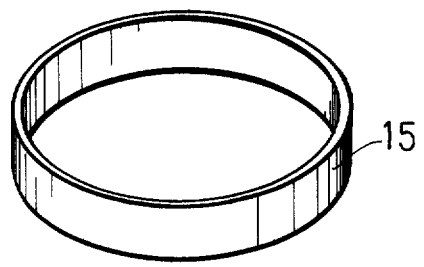
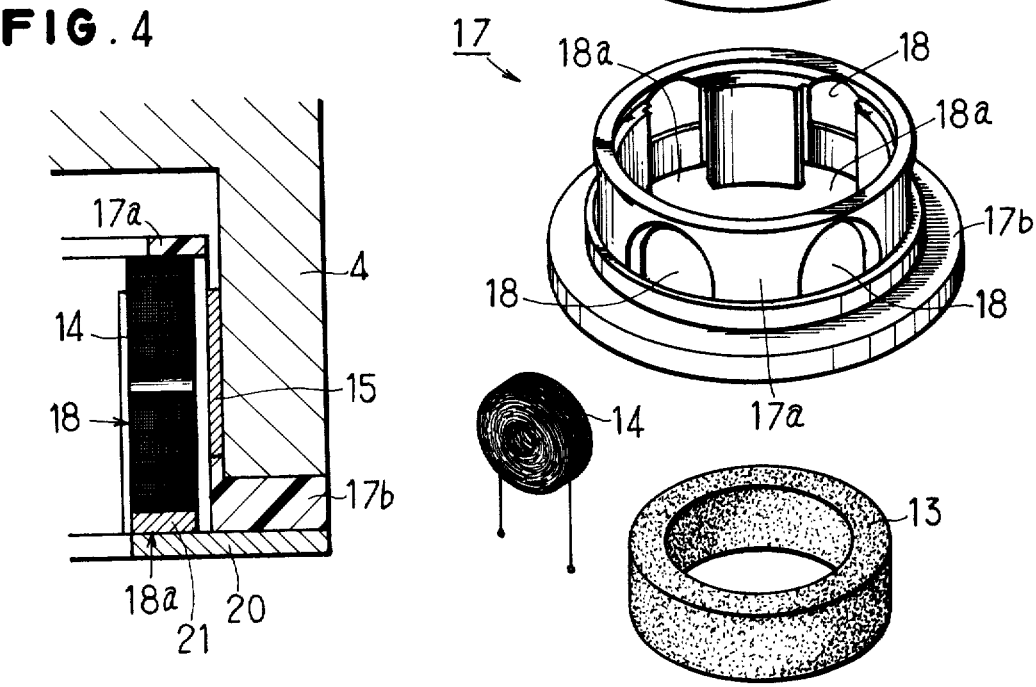

AUTOMATIC CONTROL DEVICE FOR CONTROLLING THE IRIS DIAPHRAGM IN AN OPTICAL SYSTEM

BACKGROUND OF THE INVENTION

This invention relates to an automatic control device for automatically controlling iris diaphragms in optical systems by means of an annular rotary electric motor.

There have been proposed and practically employed a variety of automatic control devices for iris diaphragms and in most of the prior art automatic control devices of the above type, although the rotor formed of a permanent magnet may be an external rotor or inner rotor as desired, the inner rotor has been in most cases employed because the inner rotor is less subjected to the influence of external magnetic force. In such a conventional automatic control device, the rotary electric motor comprises an annular rotor and an annular stator disposed about the rotor in coaxial relationship to the latter. The stator has magnetic pole receiving iron cores extending radially inwardly from the inner surface of the stator core and stator coils are wound about the magnetic pole receiving iron cores (refer to Japanese Utility Model Application Publication No. 45631/1978).

In the conventional automatic control device for iris diaphragms described hereinabove, since the coils are wound about the magnetic pole receiving iron cores projecting radially inwardly from the inner surface of the annular stator core requiring a highly skilled hand and particularly, it is very difficult to manufacture the control device as a small size device. In fact, critical reduction in the outer diameter of the stator core is limited to the order of 40 mm at the best to thereby make it impossible to manufacture the control device as a practically small size device.

And in the conventional automatic control device for iris diaphragms of the above-mentioned type, since the magnetic pole receiving iron cores and the magnetic poles formed on the rotor formed of a permanent magnet face each other directly, in order to satisfy the requirement called for the rotary electric motor for the automatic control device for iris diaphragms, that is, in order that when the rotor ceases its rotation instantly upon the interruption of current supply to the coils and maintains the stopped position precisely, it is required that the magnetic pole receiving iron cores on the stator core are slanted with respect to the axis of the core or the magnetic poles formed on the permanent magnet rotor are slanted with respect to the axis of the rotor so that the sum of the areas of the opposing ends of the magnetic pole receiving iron cores and of the magnetic poles formed on the permanent magnet rotor remains unchanged irrespective of what position the rotor may assume when the rotor ceases its rotation. Such an arrangement is of no practical use and makes it almost impossible to obtain uniform flux density distribution across the entire area of the magnetic poles formed on the permanent magnet rotor. For attaining uniform flux density distribution across the entire area of the magnetic poles, even if the magnetic pole receiving iron cores and magnetic poles are so precisely designed that the sum of the areas of the opposing ends of the iron cores and of the magnetic poles is mechanically maintained unchanged, slight irregularity inevitably occurs in magnetic attraction. Thus, the rotor can not maintain its stationary condition in a particular rotated position resulting in hunting by the electric motor.

SUMMARY OF THE INVENTION

Therefore, the present invention is to provide a practical automatic control device for controlling iris diaphragms in optical systems which can effectively eliminate the disadvantages inherent in the prior art automatic control devices for iris diaphragms referred to hereinabove.

According to the present invention, there is provided an automatic control device for iris diaphragms in optical systems having lens groups therein which comprises an outer casing adapted to be detachably secured to said optical system surrounding the optical system and an iris diaphragm drive mechanism mounted within said outer casing coaxial with the optical axis of said optical system by means of mounting means, said iris drive mechanism including an electric drive motor which comprises an annular rotor disposed coaxial with said optical axis and an annular stator surrounding said annular rotor coaxial with the rotor whereby when said electric motor is energized in response to a signal from photometer means in said optical system, the motor rotates said rotor which in turn operates the iris diaphragm, characterized by that said stator comprises an annular stator core disposed coaxial with said optical axis and a plurality of coreless coils secured to the inner periphery of said stator core in angularly spaced relationship.

The above and other objects and attendant advantages of the present invention will be more readily apparent to those skilled in the art from a reading of the following detailed description in conjunction with the accompanying drawings which show one preferred embodiment of the present invention for illustration purpose only, but not for limiting the scope of the same in any way.

BRIEF DESCRIPTION OF THE DRAWINGS

FIG. 3 is a cross-sectional view taken along substantially the line III—III of FIG. 1;

FIG. 4 is a fragmentary sectional view on an enlarged scale of the electric motor of the control device;

FIG. 5 is an exploded perspective view of the electric motor as shown in FIG. 4;

PREFERRED EMBODIMENT OF THE INVENTION

Figure 2:
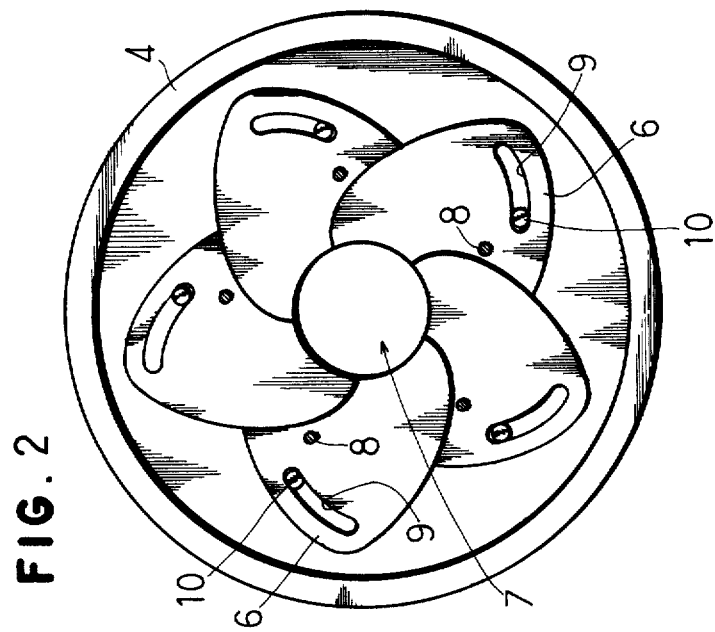
FIG. 2 is a plan view of the blade assembly for controlling the orifice in the iris diaphragm in an optical system which is controlled by the control device of FIG. 1.
Figure 1:
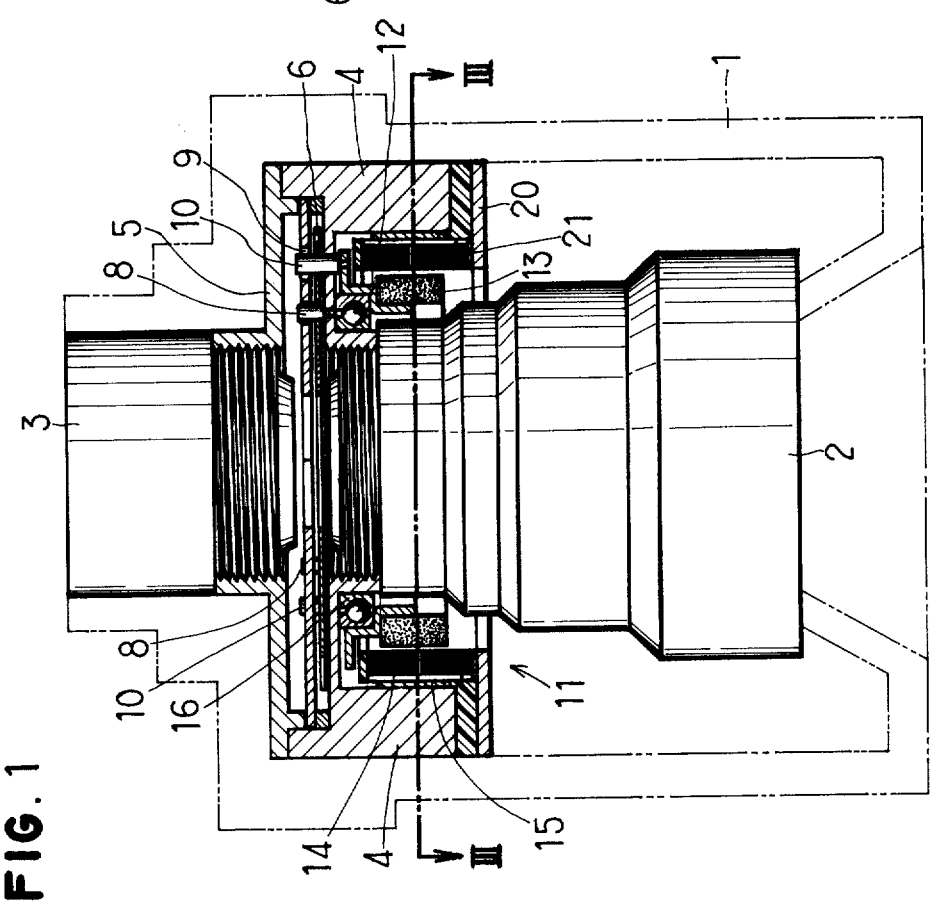
FIG. 1 is a vertical sectional view of one preferred embodiment of the automatic control device for controlling iris diaphragms in optical systems constructed in accordance with the present invention.

The present invention will be now described referring to the accompanying drawings and more particularly, to FIG. 1 thereof in which the preferred embodiment of the control device for iris diaphragms in optical systems according to the present invention is shown. In FIG. 1, reference numeral 1 denotes an outer casing which can be detachably attached to a conventional camera in the conventional manner. A forward optical cylindrical member 2 receiving a forward lens group (not shown) therein and a rearward optical cylindrical member 3 receiving a rearward lens group (not shown) therein are positioned within the outer casing 1 in spaced and coaxial relationship. The forward and rearward optical cylindrical members 2, 3 are mounted on forward and rearward mounting frames 4, 5, respectively, which are in turn secured to the interior of the outer casing 1 in axially spaced positions thereof.

A plurality of iris diaphragm orifice control blades 6 are disposed between the forward and rearward mounting frames 4, 5 in a partially overlapping relationship. The blades 6 extend radially outwardly from the common axis of the forward and rearward optical cylindrical members 2, 3 and are adapted to rotate in one and the other direction about the axis to reduce and increase the opening area of the orifice 7 defined by the blades 6.

Each of the iris diaphragm orifice control blades 6 is rotatably mounted on its associated stub shaft 8 which is in turn secured to the forward mounting frame 4 for rotation about the axis of the shaft and the blade 6 is provided with an arcuate slot 9 in which a pin 10 on a rotor which will be described in detail hereinafter is adapted to move slidably. As the pins 10 move slidably within the arcuate slots 9 in the associated blades 6 in one or the other direction in the circumferential direction of the mounting frame 4, the blades 6 rotate to vary the opening area of the orifice 7.

An iris diaphragm drive mechanism 11 is supported on the forward mounting frame 4 and comprises the abovementioned pins 10, a drive ring 12, an annular rotor 13 formed of a permanent magnet, a plurality of coreless coils 14 and a ring-shaped stator core 15 formed of magnetic material. The rotor 13 and coreless coils 14 provide an electric motor by which the rotor 13 is reciprocally rotated by an angle within the range of 20°–40°. The drive ring 12 is supported on the forward mounting plate 4 by means of ball bearings 16 in coaxial with the forward and rearward optical cylindrical members 2, 3. The above-mentioned drive pins 10 are secured to and extend from the drive ring 12 in angularly spaced relationship with one ends of the pins received in the corresponding arcuate through holes (not shown) in the rearward mounting frame 5 and the other ends of the pins received in the arcuate slots 9 in the associated blades 6.

The rotor 13 is in the form of a ring and secured to the front side of the drive ring 12 for rotation with the drive ring 12. The rotor 13 has a plurality of alternate N and S magnetic poles formed on the outer periphery of the rotor in spaced relationship in the circumferential direction of the rotor ring.

The coreless coil 14 is formed by coiling an electric wire of very small gauge so as to have a plurality of turns and has no iron core positioned in the center thereof. A plurality of coreless coils 14 of the above-mentioned construction are positioned about the outer periphery of the rotor 13 and spaced from the rotor and each other with one ends of the coils facing the outer periphery of the rotor 13. The number of the coreless coils 14 to be employed corresponds to that of the magnetic poles secured to the outer periphery of the rotor 13. The other ends of the coils 14 are in contact with the inner peripheral surface of the stator core 15. The distance between the inner peripheral surface of the core 15 and the outer peripheral surface of the rotor 13 is shorter than that between the centers of the adjacent N and S magnetic poles. In the illustrated embodiment, the distance between the core and rotor is about one half of that between the centers of the adjacent N and S magnetic poles. And the axial size of the coreless coil 14 is smaller than the distance between the stator core and rotor 15, 13 so that the coreless coils 14 are maintained out of contact with the rotor 13.

The rotor 13 and stator core 15 are disposed in coaxial relationship and the distance between the rotor and core and the thickness of the two members are so selected that the rotor 13 is attracted toward the stator core 15 with uniform attraction force along the entire peripheries of the rotor and core.

The coreless coils 14 and stator core 15 arranged in the above-mentioned manner are supported on an insulative ring 17 which has been formed by moulding synthetic resin material.

The insulative supporting ring 17 comprises a cylindrical portion 17a and a flange 17b integrally formed with and radially outwardly extending from one end of the cylindrical portion 17a. The support ring 17 is mounted on the forward mounting frame 4 by securing the flange 17b to the mounting frame 4. The cylindrical portion 17a is provided with a plurality of through coil receiving openings 18 in angularly spaced relationship in the circumferential direction of the cylindrical portion and the openings 18 are closed from outside by the stator core 15 disposed about the support ring 17. For the purpose, the stator core 15 is fitted on the cylindrical portion 17a of the support ring 17. The inner periphery of the cylindrical portion 17a of the support ring 17 is provided adjacent to the ends of the openings 18 adjacent to the flange 17b with guide bores 18a by way of which the coreless coils 14 are inserted into the support ring 17. After the insertion of the coreless coils 14 into the support ring 17, a printed circuit board 20 is secured to the side of the flange 17b remote from the cylindrical portion 17a of the support ring 17 to prevent the coreless coils 14 from coming out of the support ring 17. A cushion material 21 is fitted in the guide bores 18a for holding the coreless coils 14 against jolting.

Although not shown, the opposite ends of each of the coreless coils 14 are electrically connected to the printed circuit on the printed circuit board 20 by means of soldering and the coils 14 are so electrically connected to each other that electric current flows through the adjacent coreless coils 14 in the opposite directions.

The operation of the automatic control device for iris diaphragms having the components of the above-mentioned construction and arrangement will be now described. The quantity of light passing through the optical cylindrical members 2, 3 is measured in the conventional manner by a conventional photometer (not shown) provided within the body of a camera (not shown) and when the quantity of light reaching the photometer is larger or smaller than a predetermined or desired value, electric current is allowed to automatically flow through the coreless coils 14 to rotate the rotor 13 which in turn rotate the iris diaphragm orifice control blades 16. The blades 16 are rotated toward or away from the common axis of the optical cylindrical members 2, 3 to increase or decrease the opening area of the orifice 7 until the predetermined or desired quantity of light can be obtained. One example of the electric current control circuit associated with the automatic control device employs a bridge in which as a variable resistance a photoelectric element the resistance value of which varies depending upon the quantity of light received is provided.

Figure 6:
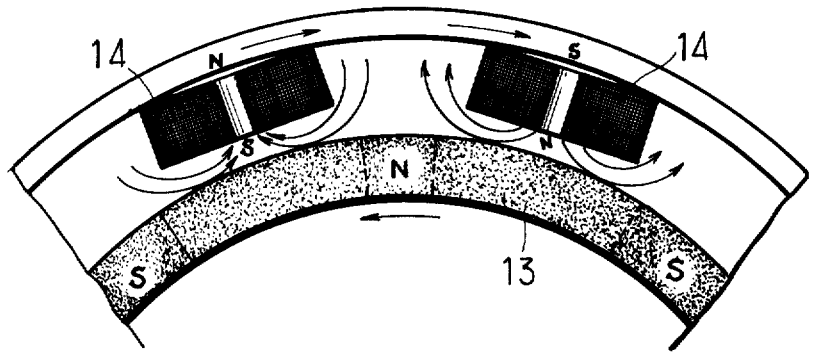
FIGS. 6 and 7 are fragmentary plan views on further enlarged scale showing the operation principle of the rotor of the control device.
Figure 7:
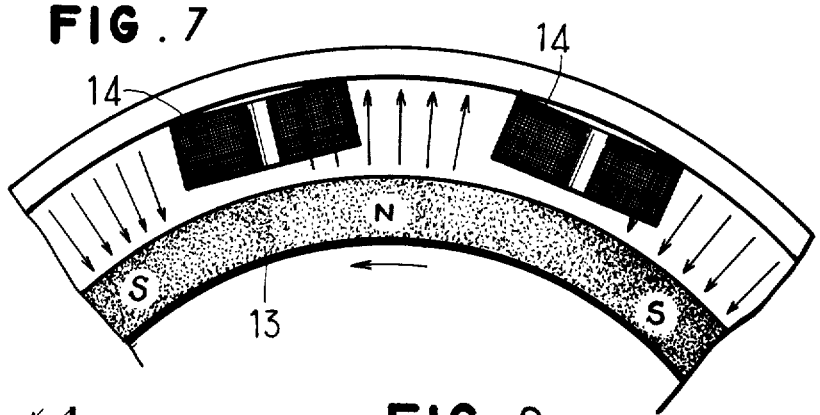

When electric current flows through the coreless coils 14 in the manner mentioned just above, the adjacent coreless coils 14, 14 . . . are so excited that the electric current flows through one of the coils in one direction and through the other of the coils in the opposite direction as shown in FIG. 6. When excited in this manner, the lines of magnetic force of the conductors of the coils 14, 14 . . . are summed up to provide a magnetic field which is similar to that provided by the coils having their center iron cores. The thus provided magnetic field interacts with the magnetic fields provided by the N, S magnetic poles on the rotor 13 to rotate the rotor 13 by the attraction-repulsion relationship between the magnetic poles of the opposite polarities. Since the rotor 13 is formed of a permanent magnet, a magnetic field space is provided between the rotor 13 and stator core 15. The line of magnet force in the magnetic field space is intersected by the conductors in the coreless coils 14 at right angles thereto to rotate the rotor 13 in accordance with the Fleming's rule to thereby rotate the blades 16 through the drive ring 12. When the supply of a signal current to the coreless coils is interrupted, the rotor 13 ceases its rotation by the attraction acting between the rotor and stator core 13, 15. At this time, the rotor 13 is held stationary under stabilized condition in any rotated position because the stator core 15 has no magnetic pole receiving iron core in any particular position of the inner surface thereof.

Figure 8:
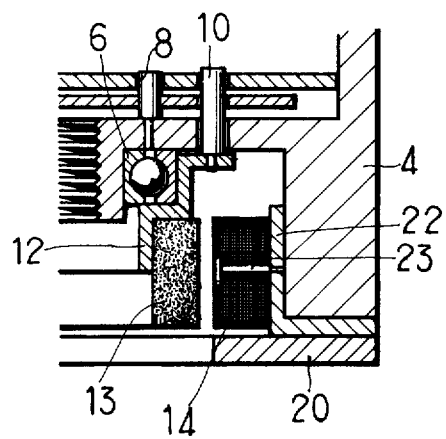
FIGS. 8 and 9 are fragmentary sectional views of modified stators to be employed in the control device of FIG. 1.
Figure 9:
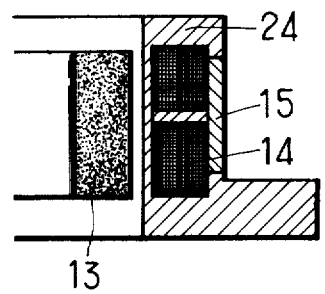

In the illustrated embodiment, assuming that the number of the coils and the current value are the same as those in the prior art control device for iris diaphragms including the cored coils, the produced torque accounts for 70% of the torque produced in the prior art control device and according to the present invention, the motor is arranged as a six-pole motor in place of the four-pole motor employed in the prior art control device whereby the torque equivalent to or above the torque produced in the prior art control device employing a four-pole motor can be obtained to make the present control device practical. In the illustrated embodiment, although the coreless coils 14 are shown as having a circular cross-section, the cross-section configuration of the coreless coils is not limited to such a configuration, but may be other cross-section configurations such as square and rectangular. And also, although the support ring 17 is employed as the support means for the coreless coils 14, instead a core 22 may be detachably secured to the forward mounting frame 4 serving as the support means for the coils 14 in place of the support ring 17 as shown in FIG. 8 and the coreless coils 14 may be secured to the core 22 by means of non-magnetic pins 23. Alternatively, as shown in FIG. 9, the coreless coils 14 and stator core 15 may be integrally embedded in a synthetic resin material 24 to provide an integral stator.

Figure 10:
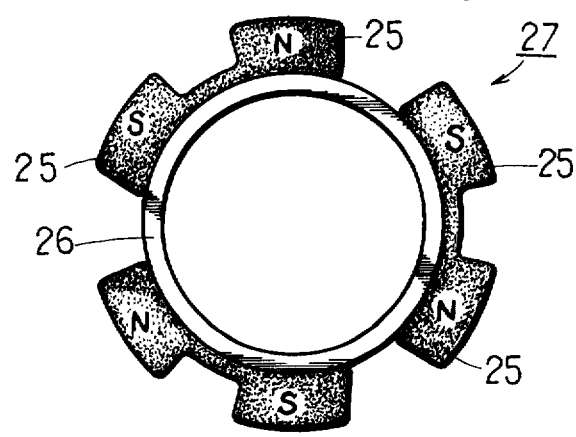
FIG. 10 is a plan view of a further modified rotor.

Furthermore, as shown in FIG. 10, a modified rotor 27 which comprises a center ring 26 and a plurality of angularly spaced alternate N and S magnetic poles 25 secured to and projecting radially outwardly from the outer periphery of the center ring 26 may be employed in place of the above-mentioned rotor 13.

With the above-mentioned construction and arrangement of the components of the automatic control device for iris diaphragms according to the present invention, since the stator of the electric motor in the iris diaphragm drive mechanism comprises the simple annular stator iron core and the plurality of coreless coils secured to the inner periphery of the stator iron core in equally spaced relationship, there are no magnetic iron cores projecting radially inwardly from the inner periphery of the stator and thus, the rotor is held stationary in any rotated or angular position under stabilized condition and the rotor is prevented from hunting when the rotor ceases its rotation.

And since the coils can be held in position by means of simple holding means and the mounting of the coils is quite simple and easy, a small size control device having the outer casing of the outer diameter as small as 20 mm useful for lenses of 10 mm diameter can be produced without difficulties.

Furthermore, the manufacture of the iron core was one of the most important problems in the production of the prior art control device for iris diaphragms, but according to the present invention, it is only necessary to process the outer casing to a thin-walled cylinder having no magnetic pole receiving iron cores projecting radially inwardly from the inner surface thereof and automatic control devices having outer casings of different diameters and/or different numbers of magnetic poles can be easily produced.

Furthermore, the secured projecting or integrally formed magnetic poles of the core are not required to be slanted with respect to the axis of the rotor as necessary in the prior art rotors and thus, the control device can be processed easily and at less expense.

While only one embodiment of the invention has been shown and described in detail it will be understood that the same is for illustration purpose only and not to be taken as a definition of the invention, reference being had for this purpose to the appended claims.

What is claimed is:

1. An automatic control device for controlling the iris diaphragm in an optical system having lens groups therein, comprising an outer casing adapted to be detachably secured to said optical system surrounding the optical system and an iris diaphragm drive mechanism mounted within said outer casing coaxial with the optical axis of said optical system by means of mounting means, said iris drive mechanism including an electric drive motor which comprises an annular rotor of a plurality of adjacent alternate N and S magnetic poles disposed coaxial with said optical axis and an annular stator surrounding said annular rotor coaxial with the rotor whereby when said electric motor is energized in response to a signal from photometer means in said optical system, the motor rotates said rotor which in turn operates the iris diaphragm, characterized in that said stator comprises an annular stator core disposed coaxial with said optical axis and a plurality of coreless coils secured to the inner periphery of said annular stator core in angularly spaced relationship, that said coreless coils and stator core are supported on an insulated support ring which is in turn mounted on said mounting means and said support ring comprises a cylindrical portion having a plurality of spaced coil receiving openings formed in the peripheral wall of said cylindrical portion and a flange integrally extending radially outwardly from one end of said cylindrical portion and secured to said mounting means and that a distance between said rotor and stator core is less than the distance between the centers of adjacent alternate N and S magnetic poles.

2. The automatic control device as set forth in claim 1, in which said plurality of spaced alternate N and S magnetic poles are formed on the outer periphery of said rotor and correspond in number to said coreless coils.

3. The automatic control device as set forth in claim 2, in which said alternate N and S magnetic poles are formed on the outer periphery of said rotor in spaced relationship.

4. The automatic control device as set forth in claim 2, in which said alternate N and S magnetic poles are secured to and extend radially outwardly from the outer periphery of said rotor in spaced relationship.

5. The automatic control device as set forth in claim 2, in which electric current flows through said adjacent alternate N and S magnetic poles in the opposite directions.

6. The automatic control device as set forth in claim 1, in which the axial size of said coreless coils is less than the distance between said rotor and stator core so that the coreless coils are maintained spaced from said rotor.

7. The automatic control device as set forth in claim 1, in which said iris drive mechanism further includes a drive ring disposed coaxial with said optical axis and supported on said mounting means by means of ball bearings for rotation with said rotor.

8. The automatic control device as set forth in claim 1, in which said cylindrical portion of the support ring is provided with coil guide bores adjacent to the ends of said openings adjacent to said flange and a printed circuit board is received in said bores to prevent said coreless coils from coming off said support ring.

9. The automatic control device as set forth in claim 1, in which said support ring is formed of moulded synthetic resin.

10. The automatic control device as set forth in claim 1, in which said stator comprises coreless coils and a stator core integrally embedded in moulded resin material.

* * * * *